Patented Mar. 10, 1925.

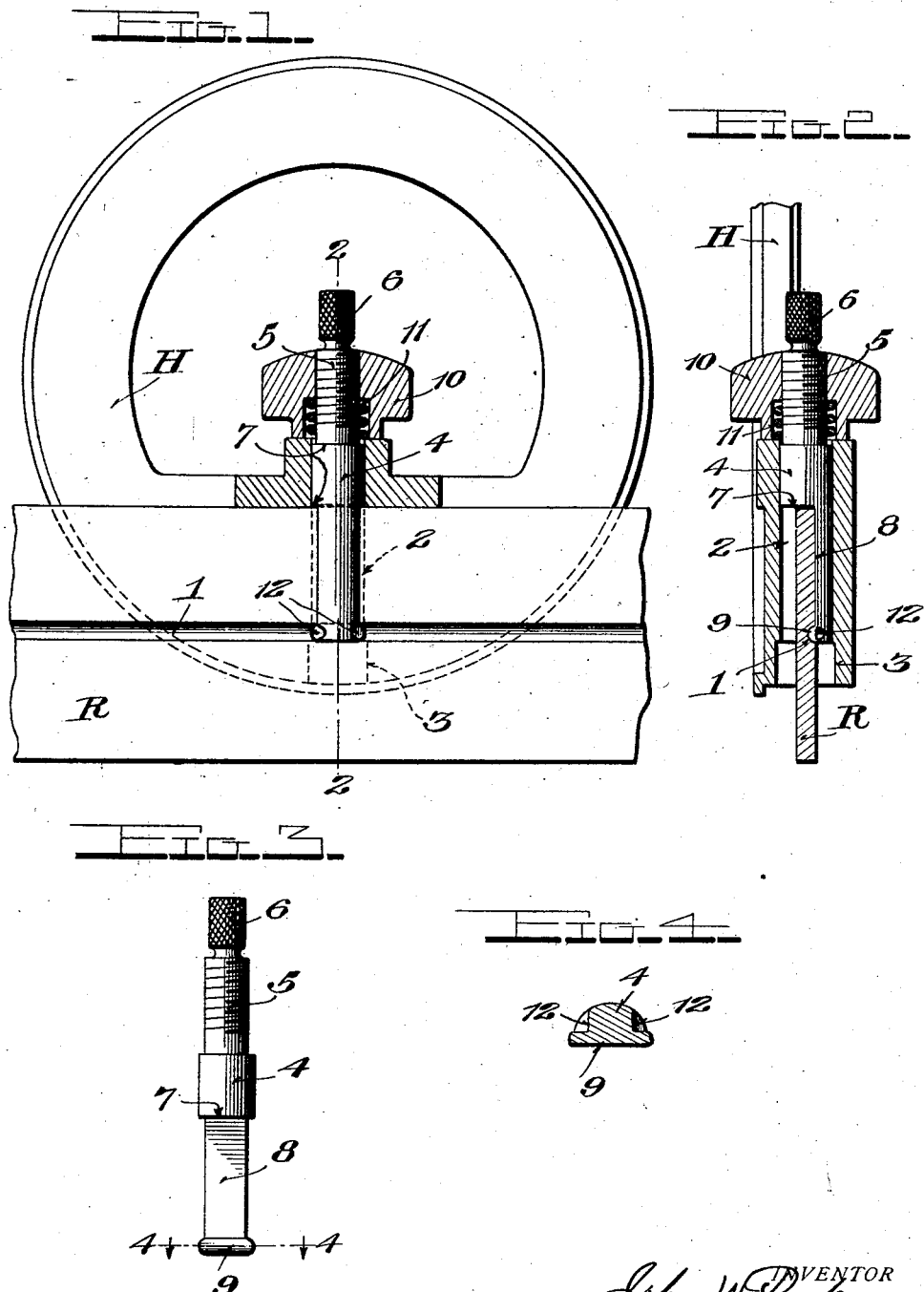

1,529,209

UNITED STATES PATENT OFFICE.

JOHN W. PARKER, OF BARRINGTON, RHODE ISLAND, ASSIGNOR TO BROWN & SHARPE MANUFACTURING COMPANY, OF PROVIDENCE, RHODE ISLAND.

PROTRACTOR.

Application filed December 15, 1923. Serial No. 680,939.

*To all whom it may concern:*

Be it known that I, JOHN W. PARKER, a citizen of the United States, residing at Barrington, in the county of Bristol and State of Rhode Island, have invented new and useful Improvements in Protractors, of which the following is a specification.

This invention relates to certain new and useful improvements in protractors and pertains more particularly to means for securing a rule to a protractor head.

The primary object of the invention is to provide improved means for enabling the rule to be secured to the head of a protractor whereby the rule may be easily and quickly removed from the head and the rule reversed to thereby enable reading of the four series of graduations disposed along the longitudinal side edges of the respective faces of the rule.

A further object of the invention is to provide simplified and economical means for reversibly attaching the rule to the head.

Further and other objects will be later set forth and manifested in the course of the following description.

In the drawings:—

Figure 1, is a side elevation of the invention partly in section, showing same applied to one form of protractor head, the rule being shown in fragment;

Figure 2 is a section on line 2—2 of Figure 1.

Figure 3, is a detail view of the attaching pin, and

Figure 4, is a section on line 4—4 of Figure 3.

The drawings illustrate the invention applied to one form of a protractor head indicated at H, it being understood however that the invention is equally applicable to centre heads, square heads and heads of varying forms. The rule indicated at R is of standard form and is provided with two series of graduations on each of its two or opposed faces, and is received in a slot provided therefor in the head.

In proceeding in accordance with the present invention, the rule is provided with a longitudinal groove 1 extending centrally of its width on one side face thereof. A hole 2 is drilled through the head and has a counterbored or enlarged lower end 3.

A clamping screw or pin is employed having a body 4, the upper end of which has a threaded shank 5 terminating in a knurled head 6, while the lower end is cut away to form a shoulder 7 and a flat face 8, a side edge of the rule being engaged with the shoulder, while a side face of the rule is engaged with the flat face 8, as depicted in Figure 2.

The free end of the reduced part of the pin shank is upset to form a transverse rib 9, which latter is preferably of substantially semi-circular cross-section and projects outwardly from the flat face 8 as shown in Figure 2, the rib conformably engaging in the groove 1 of the rule.

The ends of the rib extend outwardly beyond the side edges of the face 8 so as to increase the effective holding action of the rib against the walls defining the groove 1 in the rule, which is accomplished by displacing the shank of the pin at opposite edges thereof as indicated at 12. The rib is of greater length than the diameter of the screw and of the hole and thereby prevents inward movement of the screw into the hole.

A knurled thumb nut 10 is engaged over the threaded end 5 of the pin and encloses a coil spring 11, the latter encircling the end 5 of the pin and exerting tension on the nut to hold the latter against accidental rotation.

In order to remove the rule from the head to reverse the rule, it is merely necessary to loosen the nut 10, so as to permit the pin and thereby rib 9 to extend in the enlarged end of the hole 2 to allow the rib to be disengaged from the groove 1 of the rule, whereupon the rule is removed, the pin is given a half turn, and the rule reversed and again engaged with the pin rib, followed by tightening of the nut.

From the above it will be noted that the two keyways and fastener pin commonly used with the main pin or clamping screw are dispensed with, it being merely necessary to slightly slide and then give the pin a half-turn in removing and reversing the rule, without complete removal of the pin, as heretofore practiced in the art.

Having thus described my invention, what I claim as new and desire to secure by Letters Patent is:—

In combination with the head of a protractor having a rule-receiving slot and having a hole, the latter counterbored at the outer portion of the head, a rule in said slot formed with a longitudinal groove on a side face thereof, a clamping screw in the hole having a transverse integral rib on its outer end, said rib being received in the counterbored outer end of the hole and being of greater length than the diameter of the screw and of the hole so as to prevent movement of the rib into the hole and thereby prevent inward movement of the screw into the hole, and means on the screw to clamp the rib against the rule.

In testimony whereof I have signed my name to this specification in the presence of two subscribing witnesses.

JOHN W. PARKER.

Witnesses:
S. N. BARRY,
J. A. MILLER.